US006921887B2

(12) United States Patent
Back et al.

(10) Patent No.: US 6,921,887 B2
(45) Date of Patent: **\*Jul. 26, 2005**

(54) MICROWAVE OVEN WITH BREAD TOASTER

(75) Inventors: Yoon Gun Back, Changwon-shi (KR); Sang Jin Oh, Changwon-shi (KR)

(73) Assignee: LG Electronic Inc., Seoul (KR)

( * ) Notice: Subject to any disclaimer, the term of this patent is extended or adjusted under 35 U.S.C. 154(b) by 144 days.

This patent is subject to a terminal disclaimer.

(21) Appl. No.: 10/216,675

(22) Filed: Aug. 12, 2002

(65) Prior Publication Data

US 2003/0042252 A1 Mar. 6, 2003

(30) Foreign Application Priority Data

| Aug. 10, 2001 | (KR) | ........................................ | 2001-48382 |
| Aug. 17, 2001 | (KR) | ........................................ | 2001-49701 |
| Jan. 14, 2002 | (KR) | ........................................ | 2002-2129 |

(51) Int. Cl.[7] ............................. H05B 6/80; A47J 37/00
(52) U.S. Cl. ....................... 219/680; 219/685; 219/756; 219/739; 219/762; 99/385; 99/451
(58) Field of Search ................................ 219/685, 680, 219/725, 739, 756, 762, 763, 386, 521, 413; 99/385, 391, 392, 393, 399, 400, 402, DIG. 14, 451

(56) References Cited

U.S. PATENT DOCUMENTS

| 6,205,910 | B1 | * | 3/2001 | Vaughn ........................ 99/326 |
| 6,429,407 | B1 | * | 8/2002 | Garber et al. ................ 219/413 |
| 6,476,360 | B1 | * | 11/2002 | Huggler et al. ............. 219/386 |
| 6,539,840 | B2 | * | 4/2003 | Choi et al. .................... 99/331 |
| 6,610,970 | B1 | * | 8/2003 | Back .......................... 219/685 |
| 2002/0070212 | A1 | * | 6/2002 | Choi et al. ................... 219/680 |

FOREIGN PATENT DOCUMENTS

| JP | 62125222 | 6/1987 |
| JP | 2004131 | 1/1990 |

* cited by examiner

*Primary Examiner*—Philip H. Leung
(74) *Attorney, Agent, or Firm*—McKenna Long & Aldridge LLP

(57) ABSTRACT

Disclosed is a microwave oven having a toasting function and compact dimensions. The microwave oven comprises a cavity and a component chamber; a toaster case at a front of the component chamber and having an opening at a front thereof; a toaster door at a front of the toaster case for opening/closing the opening; a tray assembly installed in an interior of the toaster case for supporting at least one slice of bread; and a heater assembly installed in an interior of the toaster case, for heating the bread.

48 Claims, 6 Drawing Sheets

MICROWAVE OVEN WITH BREAD TOASTER

This application claims the benefit of Korean Patent Application Nos. 2001-48382, filed on Aug. 10, 2001; 2001-49701, filed on Aug. 17, 2001; and P2002-2129, filed on Jan. 14, 2002, which are hereby incorporated by reference for all purposes as if fully set forth herein.

BACKGROUND OF THE INVENTION

1. Field of the Invention

The present invention relates to a microwave oven, and more particularly, to a microwave oven with a bread toaster.

2. Discussion of the Related Art

Generally, microwave ovens are cooking appliances for heating an object by the application of microwaves. Construction of the microwave oven will now be described.

As shown in FIG. 1, the microwave oven includes generally a cavity 2 in which an object or food is heated by microwaves. The cavity is formed in an interior of a cavity assembly 1. The cavity 2 is closed and opened by the cavity door 4. A component chamber 10 that accommodates several electrical equipment components for generating microwaves is positioned close to the cavity 2 and is covered by an outer case 6. The electrical equipment includes a magnetron 12 for generating microwaves, a high-voltage transformer 14 for supplying a high voltage to the magnetron 12, and a fan 16 for producing air flow in the cavity 2 to cool the heated electrical equipment.

Since the microwave oven heats the cooking object by means of microwaves, as shown in FIG. 1, it is improper to toast bread. Accordingly, microwave ovens capable of toasting bread, as well as cooking or heating the cooking object by means of microwaves have been developed.

As one example, a microwave oven having a toasting function is disclosed in Japanese Laid-Open Patent Publication No. 1991-271630. According to the publication, the microwave oven includes a toaster for toasting a piece of bread on an upper side of an outer case thereof. Since a separate space for accommodating the bread is required on the upper portion of the cavity, the dimension of the microwave oven assembly has to be increased as a whole. Such the construction has a disadvantage of swimming against the current of the times, which requires a compactness, as well as diversification of function.

SUMMARY OF THE INVENTION

Accordingly, the present invention is directed to a microwave oven with a toaster that substantially obviates one or more of the problems due to limitations and disadvantages of the related art.

An advantage of the present invention is to provide a microwave oven having a toasting function, besides a compact appearance.

Another advantage of the present invention is to provide a microwave oven having a heater assembly capable of uniformly heating bread.

Additional features and advantages of the invention will be set forth in the description which follows, and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, there is provided with a microwave oven with a bread toaster, the microwave oven comprising: a cavity and a component chamber; a toaster case installed at a front of the component chamber, and having an opening at a front thereof; a toaster door installed at a front of the toaster case, for opening/closing the opening; a tray assembly installed in an interior of the toaster case, for supporting at least one slice of bread; and a heater assembly installed in an interior of the toaster case, for heating the bread.

A connecting lever is installed between the toaster door and the tray assembly to move the tray assembly when opening/closing the toaster door. A spring is installed at the tray array, and has the restoring force for closing the toaster door. Accordingly, the tray assembly is moved forward and rearward to be drawn outwardly through the toaster door by the connecting lever and the spring.

A case rear plate is installed in a rear portion of the toaster case, and the other end of the spring is coupled to the case rear plate. A case front plate is installed in a mouth of the toaster case, and has the number of mouths corresponding to the number of trays.

A toaster door is installed in a toaster panel which is flush with a cavity door opening/closing the cavity. At that time, a protector or insulating plate made of insulating material is installed between the toaster panel and the toaster case.

A crumb tray is movably installed in the toaster case.

The heater assembly according to one aspect of the present invention comprises a supporting plate vertically installed in the toaster case, and a heat coil wound around the supporting plate. At that time, an outer plate is installed to the outside of the supporting plate for enclosing the supporting plate and for preventing the bread from being in contact with the heat coil.

A supporter is provided for constantly maintaining an interval between the outer plate and the bread.

A terminal is installed at a rear of the supporting plate to face to the component chamber and is electrically connected to the heat coil.

The heater assembly according to another aspect of the present invention comprises an upper and lower supporting plate which are flush with each other, an upper heat coil wound around the upper supporting plate, and a lower heat coil wound around the lower supporting plate, the lower heat coil having a winding density higher than the upper heat coil.

Each front portion of the upper and lower supporting plates has a winding density greater than rear portions of the upper and lower supporting plates.

The heater assembly according to further aspect of the present invention includes at least one heating plate vertically installed in the case and at least one supporter installed on a surface of the heating plate to maintain an interval between the supporting plate and bread and formed by bending one wire.

The heating plate includes a center plate with a heat coil wound and two outer plates enclosing both sides of the center plate.

The heating plate is provided at both ends with a plurality of supporting slots for receiving the supporters, and a hanging portion inserted into the supporting slot and formed at both ends of the supporter.

The supporter has a spacer that is in contact with a surface of the heating plate, so that an interval between the heating plate and the supporter is constantly maintained.

The heating plate is provided at an end thereof with a mounting boss which is inserted and fixed into the case.

With the construction as described above, since the toaster is installed in the front space of the component chamber, the microwave oven may have a compact appearance. In this case, it is preferable for the toaster to be supplied the power via the component chamber.

The heater assembly may be vertically installed between slices of bread, and the supporters maintain the interval between the heating plate and the bread. The heating plate has the winding density of the heat coil optimized depending upon the position. Accordingly, the bread may be uniformly heated over the whole surface.

To further achieve these and other advantages and in accordance with the purpose of the present invention, It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENTS

Reference will now be made in detail to embodiments of the present invention, examples of which are illustrated in the accompanying drawings.

Figure 1:
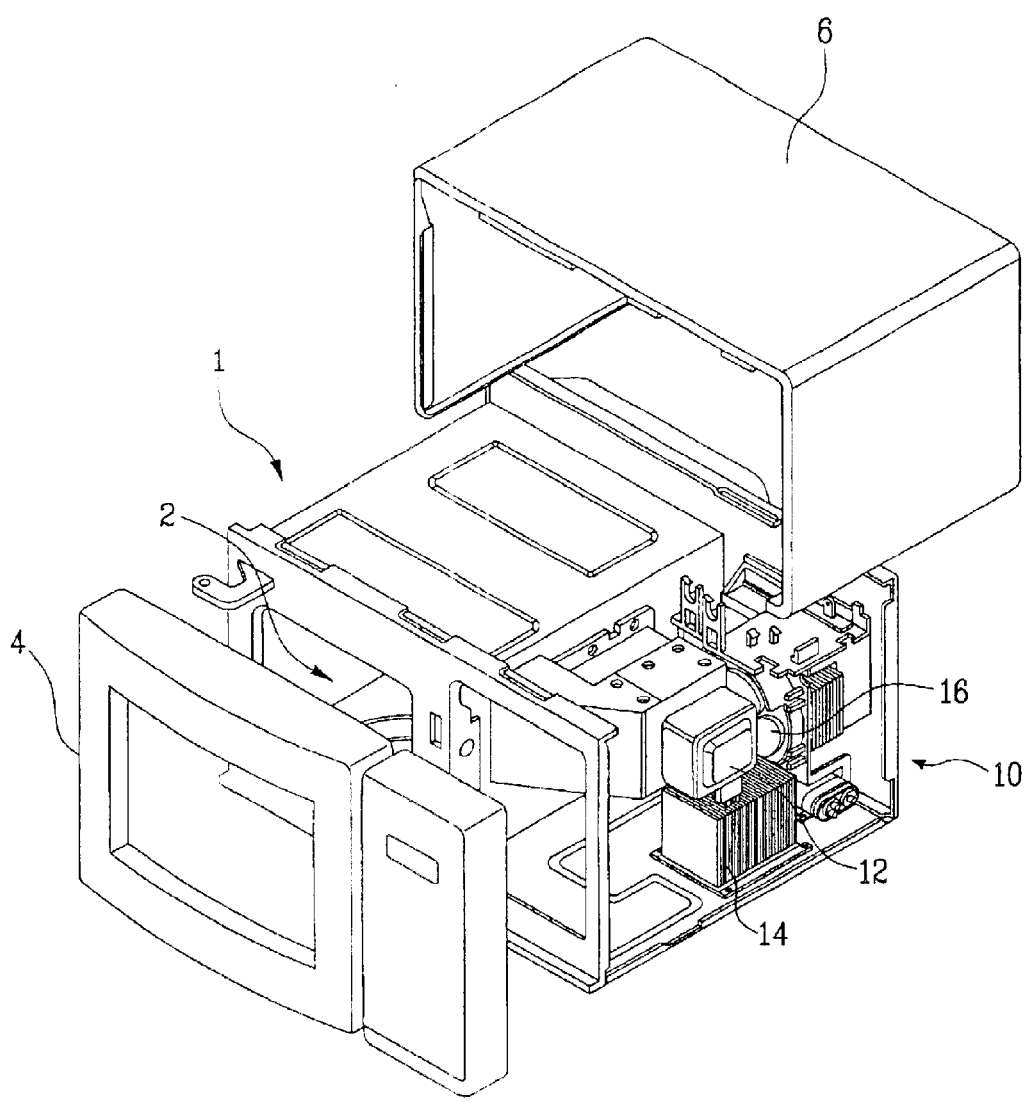
FIG. 1 is a perspective view illustrating the construction of a common microwave oven.
Figure 2:
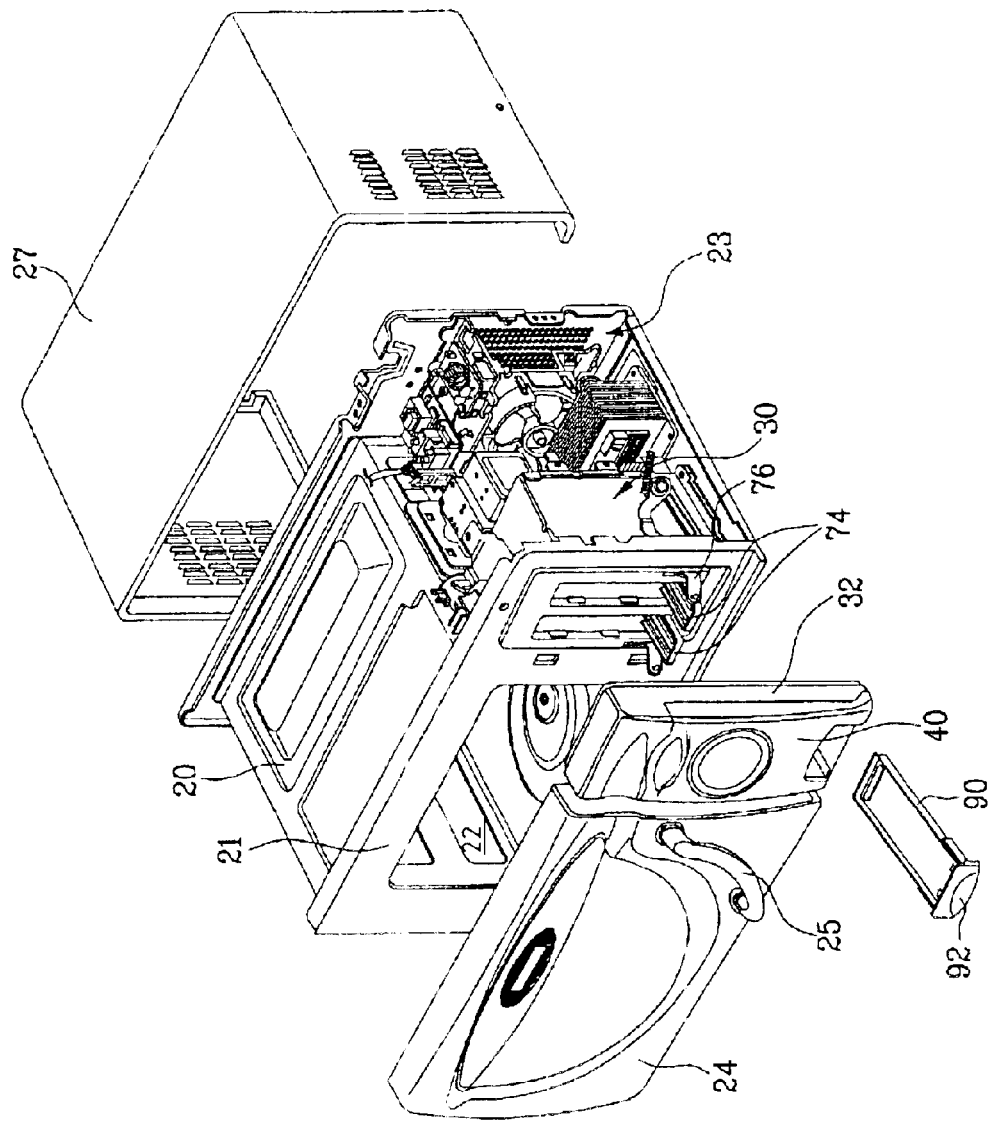
FIG. 2 is a perspective view illustrating the construction of a microwave oven with a toaster of the present invention.
Figure 3:
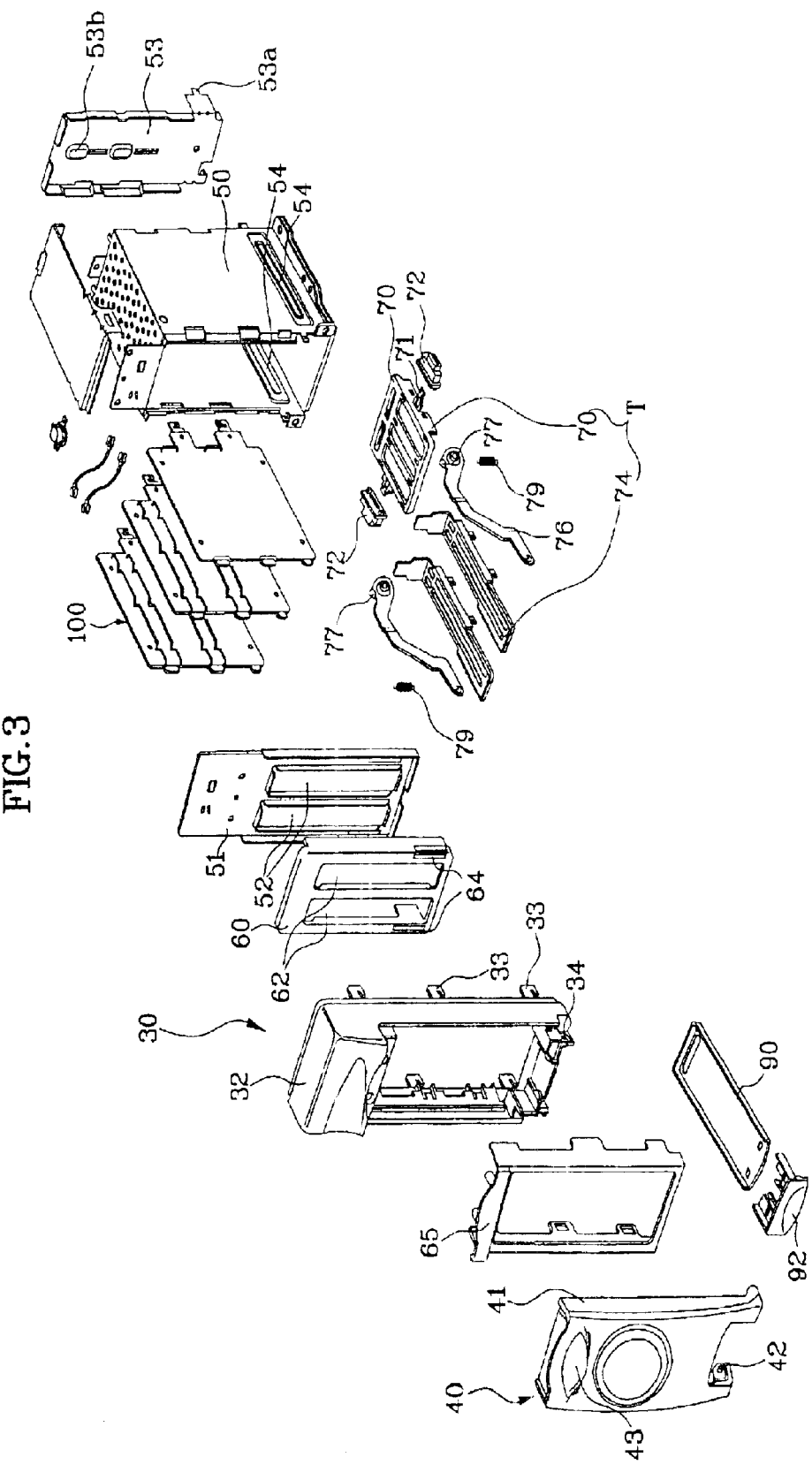
FIG. 3 is an exploded view of the microwave oven in FIG. 2.

FIG. 2 is a perspective view illustrating the construction of a microwave oven with a toaster of the present invention, and FIG. 3 is an exploded view of the microwave oven in FIG. 2.

Referring to FIG. 2, a cavity 22 is formed in an interior of a cavity assembly 20, and a component chamber 23 is positioned close to the cavity 22. An item to be cooked (e.g., food product) is heated by means of microwaves. The component chamber 23 is provided therein with several electronic equipment components for generating microwaves. The microwave oven shown in FIG. 2 includes a front plate 21.

The cavity 22 is opened and closed by a cavity door 24. If the cavity door 24 is closed, the cavity door 24 is in contact with the front plate 21 to cover the cavity 22. The cavity door 24 includes a door handle 25 which is used by a user to open or close the cavity door 24.

The cavity assembly 20 and the component chamber 23 are covered by an outer case 27 defining outer surfaces of upper and side portions of the microwave oven. A toaster 30 in the component chamber 23 is positioned in front of electronic equipments for generating microwaves. The toaster 30 is installed in such a way that it penetrates the front plate 21. A toaster panel 32 is provided at a front side of the toaster 30. Material of the outer surface of the toaster panel 32 is similar to or the same as that of the cavity door 24, so that the toaster panel 32 provides the microwave with a smooth front surface together with the cavity door 24 and a toaster door 40.

The toaster 30 according to the present invention will now be described in detail.

Referring to FIG. 3, a rear of the toaster panel 32 is provided with a plurality of fixing hooks 33, so that the toaster panel 32 is fixed to the front plate 21 (shown in FIG. 2) by the fixing hooks 33.

The toaster 30 further includes a toaster door 40 hinged to the toaster panel 32. To this end, the toaster panel 32 has a hinge hole 34, while the toaster door 40 has a hinge pin 42. The toaster door 40 may rotate around a hinge axis formed by the hinge pin 42 so as to be opened and closed. The material of the outer surface of the door panel 41 may be similar or identical to that of the toaster panel 32, so that the door panel 41 provides the microwave with a smooth front surface together with the cavity door 24 and toaster panel 32. The hinge pin 42 is positioned at a lower portion of the door panel 41 in such a way that the toaster door 40 is opened and closed by the rotation itself. The door panel 41 further includes a toaster door handle 43, so that the user easily opens and closes the toaster door 40.

The toaster 30 further includes a toaster case 50 installed at the rear side of the toaster panel 32. The toaster case 50 is coupled to the toaster panel 32 through a portion of the front plate 21 corresponding to the front side of the component chamber 23. The toaster case 50 is made of metal and provides a space for toasting the slice of bread.

There is a case front plate 51 at the front of the toaster case 50. The case front plate 51 includes two case mouths 52, each through which a slice of bread may be placed into or removed from the toaster case 50. Meanwhile, there is a case rear plate 53 at the rear of the toaster case 50. Two spring hooks 53a, which engage one end of each spring 79, are provided at a lower portion of the case rear plate 53. The case rear plate 53 has a heater slot 53b for receiving a heater assembly 100.

The toaster case 50 has a pair of moving slots 54 in or on its side walls. The pair of moving slots 54 extend toward the rear of the toaster case 50 in a direction parallel to a left or right edge of the toaster case 50. A bushing 72 is movable along each moving slot 54.

A toaster front 60 is provided at the front of the case front plate 51 and is positioned in the toaster panel 32. The toaster front 60 has two rectangular toaster mouths 62, which are exposed when the toaster door 40 is opened, as shown in FIG. 3. Each of the toaster mouths 62 is coupled to a respective case mouth 52 of the case front plate 51. Two lever slots 64 are at the lower portion of the toaster front 60. The lever slots 64 are substantially vertical or parallel to the long side of the toaster mouths 62. One of two connecting levers 76 moves through a respective lever slot 64.

An insulation plate 65 is interposed between the toaster front 60 and the toaster panel 32. The insulator plate 65 is made of insulating material to protect heat from being transferred to the toaster panel 32 from the toaster front 60.

A tray assembly T in the interior of the toaster case 50 will now be described in detail. The tray assembly T supports at least one slice of bread. The tray assembly T includes, as shown in FIG. 3, a tray support 70, and two trays 74 provided on the tray support 70. When the toaster door 40 is opened or closed, a slice of bread may be moved into the toaster case 50 via the tray assembly T.

There is an engaging portion 71 at right and left sides of the tray support 70. The bushing 72 is coupled to the end of the engaging portion 71. The bushing 72 supports the tray support 70 and is moved along the moving slot 54 provided on each side of the toaster case 50. The shape of the bushing 72 is adapted to prevent the bushing 72 and the tray support 70 from rotating as the bushing 72 moves along the moving slot 54, so that the tray 74 is always parallel with the moving slot 54. The width of the tray support 70 and a front width of the toaster case 50 are determined in such a way that the case front plate 51 is not turned over.

The tray support 70 supports at least one tray 74 in which each slice of bread is vertically positioned. The number of trays 74 is the same as the number of toaster mouths 62. A portion of the tray 74 protrudes from the corresponding toaster mouth 62 when the toaster door 40 is completely opened.

One end of the connecting lever 76 is coupled to the lower portion of the toaster door 40. The other end of the connecting lever 76 is hinged to the bushing 72 and is coupled to one end of the spring 79. The other end of the spring 79 is coupled to a spring hook 53a of the case rear plate 53. The spring 79 pulls the end of the connecting lever 76 toward the spring hook 53a.

There is a heater assembly 100 in the toaster case 50. The heater assembly 100 may have various configurations which will now be described in detail with reference accompanying drawings.

Figure 4:
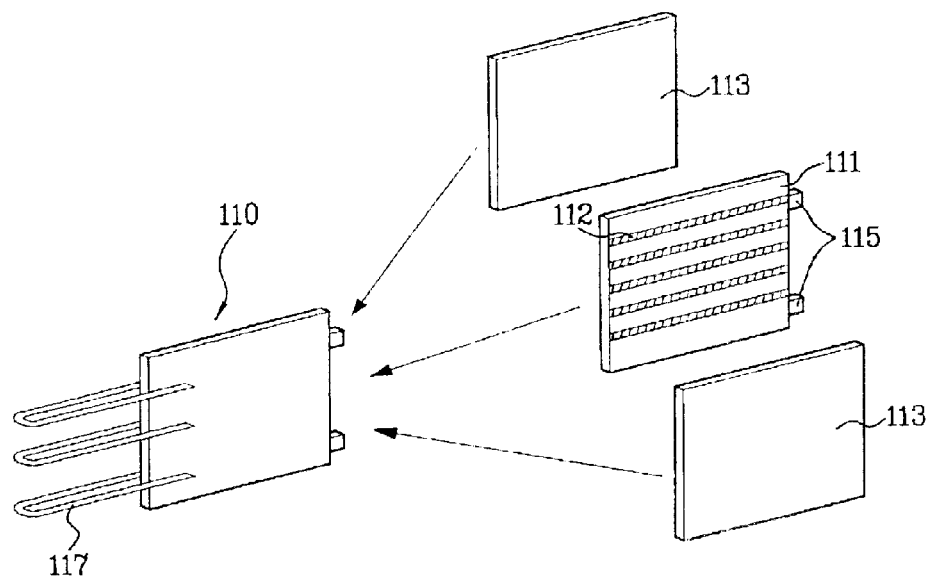
FIG. 4 is an exploded view of a heater assembly according to a first embodiment of the present invention.

First of all, FIG. 4 is an exploded view illustrating the construction of the heater assembly according to a first embodiment of the present invention.

Referring to FIG. 4, a heater assembly 110 according to the first embodiment of the present invention includes a supporting plate 111 substantially vertical in the interior of the toaster case, a heat coil 112 wound around the supporting plate 111, and an outer plate 113 covering the outer side of the supporting plate 111 and the heat coil 112 on each side surface of the supporting plate 111. There are terminals 115 at the rear portion of the supporting plate, i.e., its end facing to the component chamber. The terminal 115 supplies power to the heat coil 112. The heat coil 112 may be wrapped around the supporting plate 111 in any of a variety of directions, including horizontally and vertically.

The outer plate 113 serves to prevent bread from directly contacting the heat coil 112 and to uniformly transfer the heat generated from the heat coil 112 to the surface of the bread. To this end, preferably, the outer plate 113 is made of heat conductive material, such as a metal.

The outer plate 113 includes a plurality of supporters 117 for fixing the surface of the outer plate 113 and maintaining a constant interval between the outer plate and the bread.

Three unit heater assemblies 110 constructed as described above are provided in the toaster case 50. Two of the heater assemblies 110 are positioned at each side of the toaster case 50, while the remaining heater assembly is positioned in the center of the toaster case. (See reference number 100 in FIG. 3.) Such the construction is to simultaneously heat two slices of bread.

Figure 5:
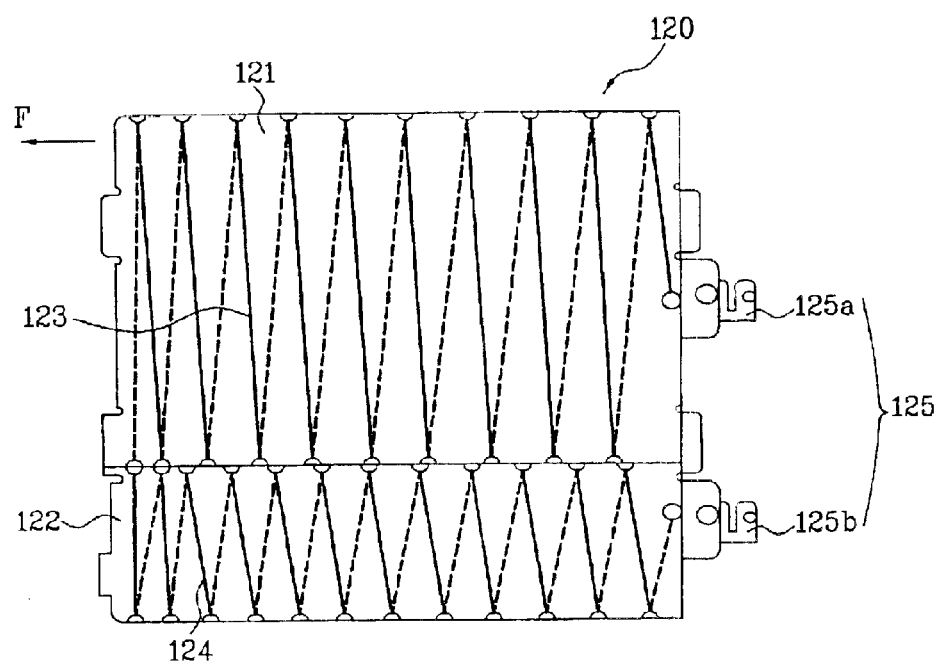
FIG. 5 is an exploded view of a heater assembly according to a second preferred embodiment of the present invention.

FIG. 5 is an exploded view illustrating the construction of the heater assembly according to a second embodiment of the present invention. Referring to FIG. 5, a heater assembly 120 according to the second embodiment of the present invention includes an upper supporting plate 121 and a lower supporting plate 122, and heat coils 123 and 124 wound around the upper and lower supporting plates 121 and 122, respectively.

The upper and lower supporting plates 121 and 122 are made of heat conductive material and are installed in such a way that the upper supporting plate 121 is substantially flush with the lower supporting plate 122.

An upper heat coil 123 is wound around the upper supporting plate 121, and a lower heat coil 124 is wound around the lower supporting plate 122. The winding shape of the heat coil is as follows.

The lower heat coil 124 is more densely wound around the lower supporting plate 122 relative to the upper heat coil 123 wound around the upper supporting plate 121. Specifically, a winding density of the lower supporting plate 122 is greater than that of the upper supporting plate 121. Such the construction is based on the principle that hot air rises. If the heat is generated from the heat coils 123 and 124, the hot air rises always. At that time, in the interior of the toaster case 50, the upper portion has a temperature higher than the lower portion. Accordingly, in order to uniformly maintain the interior temperature of the toaster case 50, the winding density of the lower supporting plate 122 should be higher than that of the upper supporting plate 121. In that case, the upper and lower portions of the bread are uniformly heated. In view of the above mentioned point, preferably, the upper supporting plate 121 has a dimension larger than the lower supporting plate 122. For example, the height of the upper supporting plate 121 is greater than the height of the lower supporting plate 122.

The upper heat coil 123 and lower heat coil 124 at the front area of the upper and lower supporting plates 121, 122 are densely wound more relative to the rear area (where the front area is the area nearest the openings or mouths of the toaster case 50, referring to FIG. 3). Specifically, the front areas of the upper and lower supporting plates 121 and 122 have a winding density higher than the rear areas. The reason is because the rear portion of the toaster case 50 is enclosed by the case rear plate 53, and the front portion is always opened by the case front plate 51. Upon generating the heat from the heat coils 123 and 124, the front portion of the toaster case 50 is closed by the toaster door 40, but the air flow may be produced through apertures. In this case, the front portion of the toaster case 50 may be easily cooled relative to the rear portion. The front and rear portions of the bread may be uniformly heated by increasing the winding density toward the front portion toaster case 50 relative to that of the rear portion of the toaster case 50. Therefore, the winding density of the front areas of the upper and lower supporting plates 121, 122 is greater than the rear areas.

Referring to FIG. 5, the upper heat coil 123 and the lower heat coil 124 are vertically or substantially vertically wound around the upper supporting plate 121 and the lower supporting plate 123, respectively. As shown in FIG. 5, the winding may be closer to vertical on one side of the supporting plates 121, 122 than on the other or may be at a slight angle with respect to vertical.

A terminal 125 for supplying a power to the heat coils 123 and 124, respectively, is provided at the rear of the upper supporting plate 121 and the lower supporting plate 122. The terminal 125 is provided at the rear of the supporting plates 121 and 122 because the toaster case 50 is installed at the front portion of the component chamber. Specifically, the terminal 125 has to be connected to an electric cable in the interior of the component chamber to connect the terminal 125 to a power supply. This connection may be easily performed by providing the terminal 125 at the rear portion of the supporting plates 121 and 122. Since the terminal 125 is provided at the rear portion of the supporting plates 121 and 122, the heat coils 123 and 124 are vertically wound around the supporting plates 121 and 122.

Figure 6:
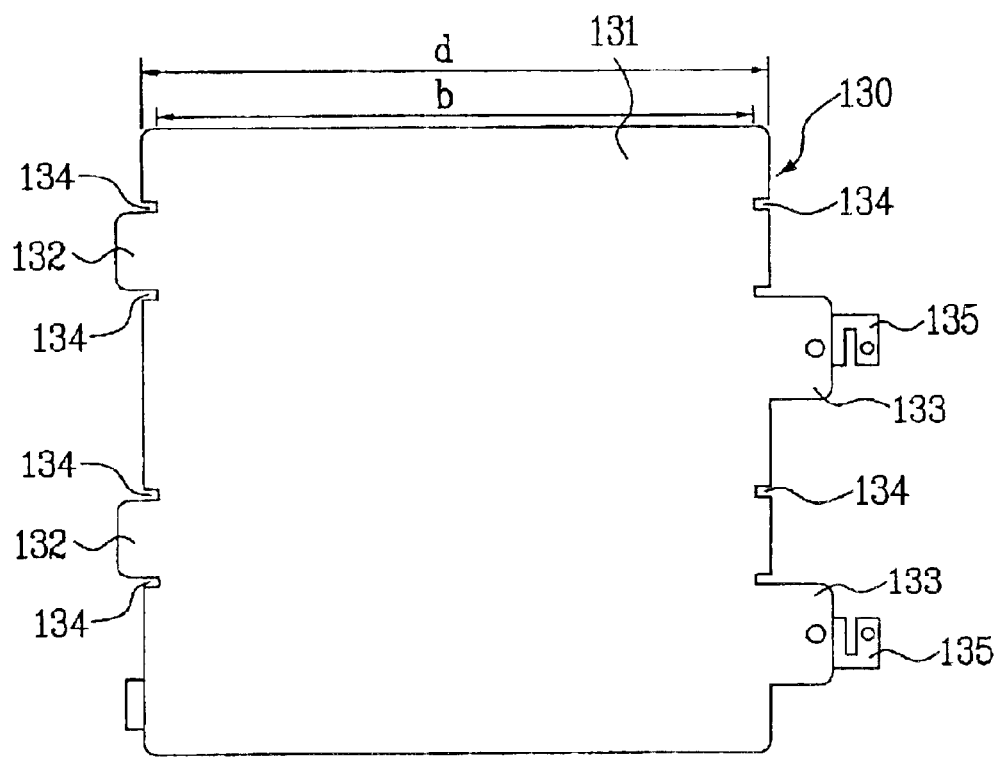
FIG. 6 is a front view of a heating plate for use in a heater assembly according to a third embodiment of the present invention.
Figure 7:
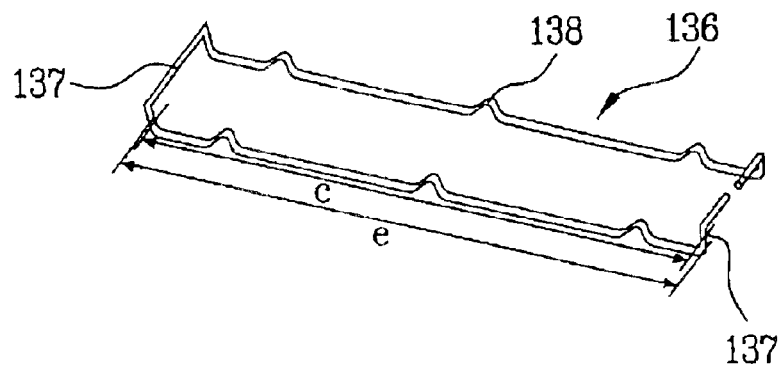
FIG. 7 is a perspective view of a supporter for use in a heater assembly according to the third embodiment of the present invention.
Figure 8:
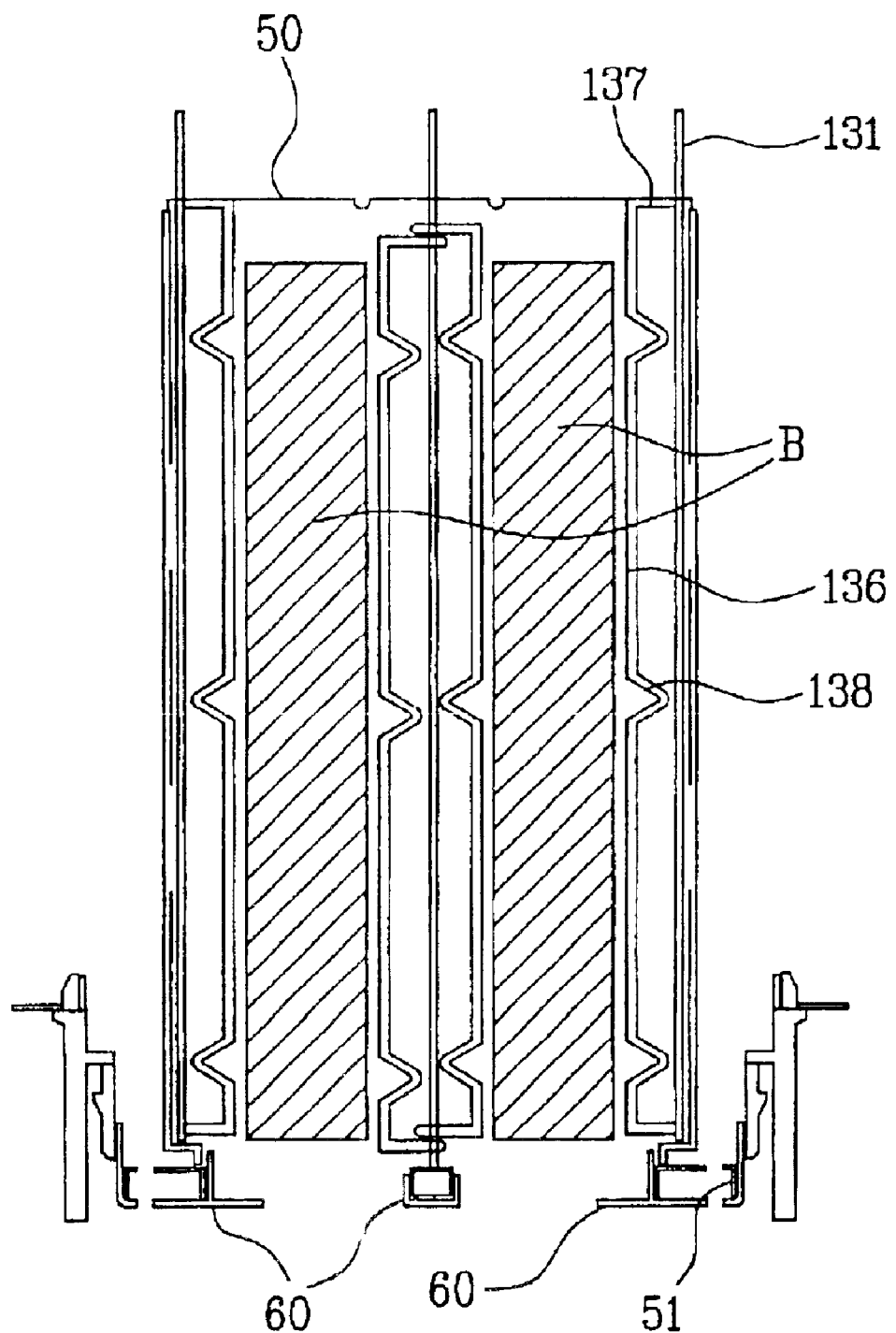
FIG. 8 is a horizontal cross sectional view illustrating a state in that a bread is accommodated in a heater assembly according to the third embodiment of the present invention.

FIG. 6 is a front view of the heating plate for use in the heater assembly according to the third embodiment of the present invention. FIG. 7 is a perspective view of the supporter for use in the heater assembly according to the third embodiment of the present invention. FIG. 8 is a horizontal cross sectional view illustrating a state in which bread is accommodated in the heater assembly according to the third embodiment of the present invention.

Referring to FIGS. 6 and 7, the heater assembly 130 according to the third embodiment of the present invention includes at least one heating plate 131 vertically installed in the toaster case 50, and at least one supporter 136, formed by bending one wire, for maintaining a distance between the heating plate 131 and the bread.

The heating plate 131 includes three silicon plates and a heat coil (not shown). The silicon plates are composed of a center plate with the heat coil wound and outer plates adhered to both sides of the center plate.

The heating plate 131 is formed with a plurality of supporting slots 134 for receiving a supporter 136. A pair of supporting slots 134 are provided at the front and rear ends of the heating plate 131, respectively.

Front mounting boss 132 and a rear mounting boss 133 are provided at the front and rear ends of the heating plate 131, respectively. The front mounting boss 132 is coupled to the rear surface of the case front plate 51, while the rear mounting boss 133 is inserted into the heater slot 53b of the case rear plate 53. It is preferable to form the supporting slot 134 on both ends of the front mounting boss 132. The reason is to make the supporter 136 more stable. The rear mounting boss 133 is provided with a terminal 135 electrically connected to the heat coil.

The supporter 136 may be formed by bending one wire, as illustrated in detail in FIG. 7. Referring to FIG. 7, the supporter 136 has a length corresponding to a distance from the front end of the heating plate 131 to the rear end thereof. A hanging portion 137 is provided at both ends of the supporter 136 and is positioned in the supporting slot 134. A plurality of spacers 138 are positioned at regular intervals along the supporter 136. The spacer 138 is in contact with the surface of the heating plate 131 so that an interval between the heating plate 131 and the supporter 136 is maintained to prevent bread from directly contacting the heating plate 131. The hanging portion 137 and the spacer 138 protrude in the same direction.

The relationship of the dimensions and relative positions of the heating plate 131 and the supporter 136 will now be described. A distance b between the supporting slots 134 is equal to or shorter than a distance c between insides of the hanging portions 137. A distance d between the front and rear ends of the heating plate 131 is equal to or longer than a distance e between outsides of the hanging portions 137. The difference between distances c and e corresponds to twice the thickness of the wire forming the supporter 136.

The operation of the heater assembly according to the third embodiment of the present invention will now be described in detail.

The hanging portion 137 is inserted into the supporting slot 134, so that the supporter 136 is adjacent to the heating plate 131. At that time, the supporter 136 is stably fixed to the heating plate 131 under the conditions of the distances b, c, d and e. Of course, since the distance d between the front and rear ends of the heating plate 131 is equal to or longer than the distance e between the outsides of the hanging portions 137, it is necessary to slightly bend the heating plate 131 to deform it upon first assembling it with the supporter 136.

As can be seen in FIG. 8, a plurality of the heating plates 131 are vertically installed in the toaster case 50 at a desired interval. As one example, three heating plates 131 are provided in the toaster case 50, so that two slices of bread B can be simultaneously heated. In case of the heating plate 131, which is positioned at the center, the supporters 136 are provided at both sides of the heating plate 131 and may be provided vertically. In the case where the supporters are vertical, the slots 134 and the mounting bosses 132 would be on the top and bottom of the heating plate 131. At that time, an interval between the supporters 136 installed at the adjacent heating plates 131 is selected to be slightly wider than a width of the bread B. The bread B inserted between the heating plates 131 faces the heating plates 131, with both sides of the bread being supported by the supporters 136. By constantly maintaining the interval between the heating plate 131 and the bread B, both sides are uniformly heated. Because the bread B is vertically supported by the supporters 136, the front end of the bread is smoothly moved, without being caught by the case front plate 51 when being removed from the toaster.

Again referring to FIG. 3, a crumb tray 90 is slidingly installed in the toaster case 50. The crumb tray 90 is to collect crumbs produced when toasting or moving the bread. The crumb tray 90 is slidingly received through the lower portion of the toaster panel 32. To this end, a crumb tray handle 92 is provided at a front portion of the crumb tray 90. The crumb tray handle 92 is positioned between the hinge pins 42 of the toaster door 40. The user pulls the handle 92 so as to remove the crumb tray 90, and after empting the crumb tray 90, the crumb tray 90 is positioned in the toaster case 50 by pushing the handle 92. Material of the crumb tray 90 is the same as that of the door panel 41.

The operation of the microwave oven according to the present invention will now be described in detail.

As shown in FIGS. 2 and 3, the mouths 52 and 62 are closed by the toaster door 40 provided at the front of the toaster panel 32, and the toaster panel 32 is flush with the toaster door 40, thereby forming a substantially smooth surface.

If the user pulls the toaster door handle 43 so as to open the toaster door 40, the toaster door 40 is rotated around the hinge axis formed by the hinge pin 42. At the same time, the connecting lever 76 moves the bushing 72 along the moving slot 54. And then, the bushing 72 moves the tray supporter 70 forward. If the toaster door 40 is completely opened, a portion of the front end of the tray 74 protrudes from the toaster mouth 62. Since the tray 74 is fixed to the tray supporter 70, the tray 74 is forwardly moved when the toaster door 40 is opened. Next the user puts on the slice of bread on the tray 74.

After the bread is put on the tray 74, if the toaster door 40 is closed, the tray supporter 70 is returned to its original position by the restoring force of the spring 79. And then, if the power is supplied to the heater assembly 100, the bread is heated by the heat generated from the heat coil. At that time, with the construction of the heater assembly 100, the bread may be uniformly heated in general.

If the bread is completely toasted after a desired time, the user pulls the toaster door handle 43, the toaster door 40 is opened, and the tray support 70 is drawn forward.

The microwave oven according to the present invention has some advantages as following.

First, the microwave oven of the present invention additionally includes the toaster. Accordingly, in addition to the cooking of the foods by use of microwaves, the bread may be toasted by use of the hear source of the heater, so that more uses of the appliance are possible.

Second, the microwave oven of the present invention includes the toaster installed in the front space of the component chamber. The toaster may be installed without reducing the space of the cavity or enlarging the whole dimension of the appliance, thereby compacting the article. In this case, there is a merit in that the power required for the toaster is easily provided from the component chamber.

Finally, the microwave oven of the present invention includes the heater assembly having the supporters for maintaining the interval between the heating plate and the bread. The heating plate has a heat coil with a winding density that is optimized depending upon the position of the heating plate in the toaster. Accordingly, the bread may be uniformly heated over the whole surface. Furthermore, since the bread is supported at a correct position by the supporter, the process of removing the bread from the toaster may be correctly performed.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

What is claimed is:

1. A microwave oven with a bread toaster, the microwave oven comprising:
    a cavity and a component chamber;
    a toaster case at a front of the component chamber and having an opening at a front;
    a toaster door installed at a front of the toaster case for opening/closing the opening;
    a tray assembly installed in an interior of the toaster case for supporting at least one slice of bread, the tray assembly including a moveable tray support and at least one tray installed on an upper portion of the tray support for supporting the slice of bread; and
    a heater assembly installed in an interior of the toaster case for heating the bread.

2. The microwave oven as claimed in claim 1, further comprising a connecting lever between the toaster door and the tray assembly, for moving the tray assembly when opening/closing the toaster door.

3. The microwave oven as claimed in claim 2, wherein the toaster door has a hinge axis about which the toaster door is rotated to open and close the opening.

4. The microwave oven as claimed in claim 3, wherein the hinge axis is at a lower portion of the toaster door.

5. The microwave oven as claimed in claim 4, wherein the hinge axis is horizontal and the toaster door is capable of rotating upward and downward around the hinge axis.

6. The microwave oven as claimed in claim 2, further comprising a spring having one end coupled to the tray assembly.

7. The microwave oven as claimed in claim 6, wherein the tray assembly is drawn outwardly through the toaster door while being moved forward and rearward by the connecting lever and the spring.

8. The microwave oven as claimed in claim 7, wherein the toaster case has a moving slot for guiding the forward and rearward movement of the tray assembly.

9. The microwave oven as claimed in claim 8, wherein the tray support is moveable forward and rearward along the moving slot of the toaster case.

10. The microwave oven as claimed in claim 9, wherein the tray support has a bushing slidingly moveable along the moving slot.

11. The microwave oven as claimed in claim 10, wherein the connecting lever has one end hinged to the bushing, and the other end hinged to the toaster door.

12. The microwave oven as claimed in claim 11, wherein the spring has one end coupled to the one end of the connecting lever.

13. The microwave oven as claimed in claim 12, further comprising a case rear plate installed in a rear portion of the toaster case, and the other end of the spring being fixed to the case rear plate.

14. The microwave oven as claimed in claim 9, further comprising a case front plate in the opening of the toaster case and having the number of mouths corresponding to the number of trays.

15. The microwave oven as claimed in claim 1, further comprising a cavity door for opening and closing the cavity and a toaster panel which is flush with the cavity door, the toaster panel accommodating the toaster door.

16. The microwave oven as claimed in claim 15, further comprising an insulation plate between the toaster panel and the toaster case, the insulation plate including insulating material.

17. The microwave oven as claimed in claim 1, further comprising a crumb tray moveable in the toaster case.

18. The microwave oven as claimed in claim 1, wherein the heater assembly includes a supporting plate vertically installed in the toaster case and a heat coil over the supporting plate.

19. The microwave oven as claimed in claim 18, wherein the heat coil is wound around the supporting plate.

20. The microwave oven as claimed in claim 18, wherein the heater assembly includes an outer plate enclosing the supporting plate for preventing the bread from directly contacting the heat coil.

21. The microwave oven as claimed in claim 20, wherein the heater assembly includes a supporter for maintaining a substantially constant interval between the outer plate and the bread.

22. The microwave oven as claimed in claim 20, wherein the outer plate is made of asbestos.

23. The microwave oven as claimed in claim 18, wherein the heater assembly further includes a terminal at a rear of the supporting plate facing the component chamber and electrically connected to the heat coil.

24. The microwave oven as claimed in claim 18, wherein the toaster case has three supporting plates spaced apart from each other.

25. The microwave oven as claimed in claim 1, wherein the heater assembly includes upper and lower supporting plates which are substantially flush with each other, an upper heat coil wound around the upper supporting plate, and a lower heat coil wound around the lower supporting plate, the lower heat coil having a winding density greater than the upper heat coil.

26. The microwave oven as claimed in claim 25, wherein front portions of the upper and lower supporting plates have a winding density greater than rear portions of the upper and lower supporting plates.

27. The microwave oven as claimed in claim 25, wherein the heater assembly further includes a terminal at a rear of the upper and lower supporting plates facing the component chamber and electrically connected to the upper and lower heat coils.

28. The microwave oven as claimed in claim 1, wherein the heater assembly includes a supporting plate vertical in the toaster case, and a heat coil vertically wound around the supporting plate, a winding density of a front portion of the supporting plate facing to the toaster door being greater than that of a rear portion of the supporting plate.

29. The microwave oven as claimed in claim 1, wherein the heater assembly includes at least one heating plate vertical in the toaster case and at least one supporter installed on a surface of the heating plate to maintain an interval between the heating plate and bread.

30. The microwave oven as claimed in claim 29, wherein the supporter comprises a bent wire.

31. The microwave oven as claimed in claim 29, wherein the heating plate includes a center plate having a heat coil wound around the center plate and two outer plates enclosing both sides of the center plate.

32. The microwave oven as claimed in claim 31, wherein the center plate and the outer plates include silicon.

33. The microwave oven as claimed in claim 29, wherein the heating plate is provided at both ends with a plurality of supporting slots for receiving the supporters, and the supporter includes a hanging portion compatible with a corresponding supporting slot.

34. The microwave oven as claimed in claim 33, wherein the supporter includes at least one hanging portion at respective ends of the supporter.

35. The microwave oven as claimed in claim 29, wherein the supporter has a spacer which is in contact with a surface of the heating plate, so that an interval between the heating plate and the supporter is maintained.

36. The microwave oven as claimed in claim 29, wherein the heating plate includes a mounting boss at least one end of the heating plate, whereby the heating plate is inserted and fixed into the case.

37. The microwave oven as claimed in claim 36, wherein the mounting boss has at least two ends and each end of the mounting boss has a supporting slot for receiving the supporter.

38. The microwave oven as claimed in claim 36, wherein the heater assembly further includes a terminal at the mounting boss and electrically connected to the heat coil.

39. A microwave oven with a bread toaster, the microwave oven comprising:
 a cavity and a component chamber;
 a toaster case at a front of the component chamber and having an opening at a front;
 a toaster door installed at the front of the toaster case for opening/closing the opening;
 a tray assembly installed in an interior of the toaster case for supporting at least one slice of bread; and
 a heater assembly installed in an interior of the toaster case for heating the bread, wherein the heater assembly includes:
  an upper supporting plate;
  a lower supporting plate substantially flush with the upper supporting plate;
  an upper heat coil vertically wound around the upper supporting plate; and
  a lower heat coil vertically wound around the lower supporting plate.

40. The microwave oven as claimed in claim 39, wherein a winding density of the lower heat coil is greater than a winding density of the upper heat coil.

41. The microwave oven as claimed in claim 39, wherein the upper and lower supporting plates have a front side proximate the opening and a rear side opposing the front side; and
 a winding density of the upper and lower heat coils at the front side is greater than a winding density of the upper and lower heat coils at the rear side.

42. The microwave oven as claimed in claim 39, wherein the heater assembly further includes a terminal at the rear side, facing the component chamber, and electrically connected to the upper and lower heat coils.

43. A microwave oven with a bread toaster, the microwave oven comprising:
 a cavity and a component chamber;
 a toaster case at a front of the component chamber and having an opening at a front;
 a toaster door installed at the front of the toaster case for opening/closing the opening;
 a tray assembly installed in an interior of the toaster case for supporting at least one slice of bread; and
 a heater assembly installed in an interior of the toaster case for heating the bread, wherein the heater assembly includes:
  at least one heating plate vertically arranged within the toaster case;
  a plurality of receiving slots provided at opposing ends of the at least one heating plate; and
  at least one supporter received within the plurality of receiving slots, the at least one supporter maintaining an interval between the heating plate and bread.

44. The microwave oven as claimed in claim 43, further including hanging portions at opposing ends of the at least one supporter.

45. The microwave oven as claimed in claim 43, wherein the supporter has a spacer contacting a surface of the heating plate to maintain the interval between the heating plate and the supporter.

46. The microwave oven as claimed in claim 43, wherein the heating plate includes a mounting boss fixing one end of the heating plate to the case.

47. The microwave oven as claimed in claim 46, wherein the mounting boss has at least two ends and each end of the mounting boss has a supporting slot for receiving the supporter.

48. The microwave oven as claimed in claim 46, wherein the heater assembly further includes a terminal at the mounting boss and electrically connected to the heat coil.

* * * * *